United States Patent
Farley et al.

(10) Patent No.: US 12,092,352 B2
(45) Date of Patent: Sep. 17, 2024

(54) SYSTEMS AND METHODS OF DETECTING AN OBSTRUCTED FURNACE AIR FILTER USING A PRESSURE SENSOR

(71) Applicant: Rheem Manufacturing Company, Atlanta, GA (US)

(72) Inventors: Darryl Farley, Fayetteville, AR (US); Christopher Taylor, Atlanta, GA (US)

(73) Assignee: Rheem Manufacturing Company, Atlanta, GA (US)

( * ) Notice: Subject to any disclaimer, the term of this patent is extended or adjusted under 35 U.S.C. 154(b) by 265 days.

(21) Appl. No.: 16/986,476

(22) Filed: Aug. 6, 2020

(65) Prior Publication Data

US 2022/0042707 A1  Feb. 10, 2022

(51) Int. Cl.
| | | |
|---|---|---|
| F24F 11/64 | (2018.01) | |
| B01D 46/00 | (2022.01) | |
| F23N 1/00 | (2006.01) | |
| F24F 11/39 | (2018.01) | |
| F24F 11/52 | (2018.01) | |

(Continued)

(52) U.S. Cl.
CPC ......... *F24F 11/64* (2018.01); *B01D 46/0086* (2013.01); *F23N 1/002* (2013.01); *F24F 11/39* (2018.01); *F24F 11/52* (2018.01); *F24H 3/006* (2013.01); *G01L 13/00* (2013.01); *B01D 2279/00* (2013.01); *F23N 2225/06* (2020.01)

(58) Field of Classification Search
USPC .................................... 432/32; 700/275, 276
See application file for complete search history.

(56) References Cited

U.S. PATENT DOCUMENTS

| | | | | |
|---|---|---|---|---|
| 4,688,547 A | * | 8/1987 | Ballard | ................... F23N 1/022 |
| | | | | 126/116 A |
| 5,451,929 A | * | 9/1995 | Adelman | ............. G08B 17/117 |
| | | | | 236/1 R |
| 6,354,367 B1 | | 3/2002 | Gong et al. | |

(Continued)

FOREIGN PATENT DOCUMENTS

| | | |
|---|---|---|
| CN | 110701941 A | 1/2020 |
| CN | 110701942 A | 1/2020 |

(Continued)

OTHER PUBLICATIONS

Kaltra GmbH (Apr. 9, 2018). "Microchannel heat exchangers as an advanced alternative to traditional HVAC coils", available at https://www.kaltra.com/single-post/2018/04/09/microchannel-heat-exchangers.

(Continued)

*Primary Examiner* — Steven B McAllister
*Assistant Examiner* — John E Bargero
(74) *Attorney, Agent, or Firm* — Eversheds Sutherland (US) LLP

(57) ABSTRACT

The disclosed technology includes systems and methods for detecting an obstructed air filter in a furnace. The disclosed technology can include a method and system that includes an air inlet, an air filter for filtering particles from air passing through the air inlet, an air moving device, a fuel valve, a burner, a pressure sensor, and a controller in communication with the pressure sensor and configured to output an alarm signal when the controller receives differential pressure data from the pressure sensor that indicates that the air filter is obstructed.

14 Claims, 5 Drawing Sheets

(51) Int. Cl.
    *F24H 3/00*    (2022.01)
    *G01L 13/00*   (2006.01)

(56) References Cited

U.S. PATENT DOCUMENTS

| | | | |
|---|---|---|---|
| 6,535,838 B2 * | 3/2003 | Abraham | F23N 5/265 |
| | | | 702/183 |
| 6,550,273 B2 | 4/2003 | Fujitaka et al. | |
| 6,616,428 B2 | 9/2003 | Ebara et al. | |
| 9,188,372 B2 | 11/2015 | Thomas et al. | |
| 9,360,259 B2 | 6/2016 | Oritani et al. | |
| 9,448,013 B2 | 9/2016 | Ito et al. | |
| 9,651,317 B2 | 5/2017 | Jindou et al. | |
| 9,677,818 B2 | 6/2017 | Numata et al. | |
| 10,035,937 B2 | 7/2018 | Yana Motta et al. | |
| 10,119,718 B2 * | 11/2018 | Hoglund | F24F 11/39 |
| 10,180,257 B2 | 1/2019 | Cur et al. | |
| 10,287,469 B2 | 5/2019 | Kontomaris et al. | |
| 10,539,358 B2 | 1/2020 | Suzuki et al. | |
| 10,823,407 B2 * | 11/2020 | Mullin | F23N 1/082 |
| 2009/0084129 A1 | 4/2009 | Kim et al. | |
| 2009/0107167 A1 | 4/2009 | Kim et al. | |
| 2010/0193155 A1 | 8/2010 | Nakatani et al. | |
| 2012/0323377 A1 * | 12/2012 | Hoglund | F24F 11/30 |
| | | | 700/277 |
| 2016/0314677 A1 * | 10/2016 | Breslin | G08B 21/18 |
| 2017/0131034 A1 | 5/2017 | Ribarov et al. | |
| 2018/0140989 A1 * | 5/2018 | Arthur | H04W 4/33 |
| 2019/0368817 A1 | 12/2019 | Huang et al. | |
| 2020/0149749 A1 | 5/2020 | Tallakson et al. | |
| 2021/0190365 A1 | 6/2021 | King et al. | |

FOREIGN PATENT DOCUMENTS

| | | |
|---|---|---|
| CN | 110848814 A | 2/2020 |
| CN | 210741214 U | 6/2020 |
| EP | 2306122 B1 | 7/2017 |
| JP | S63254315 A | 10/1988 |
| JP | 5665937 B1 | 3/2015 |
| JP | 2015049004 A | 3/2015 |
| KR | 20050048392 A | 5/2005 |
| KR | 20140053457 A | 5/2014 |
| KR | 101681585 B1 | 12/2016 |
| WO | 2008025783 A2 | 3/2008 |
| WO | 2014156190 A1 | 2/2017 |
| WO | 2017103988 A1 | 6/2017 |

OTHER PUBLICATIONS

H.L.M. Lee, Advantages and Disadvantages of Using Thermocouples, Sep. 4, 2019 https://sciencing.com/advantages-disadvantages-using-thermocouples-6153729.html (Year: 2019).

* cited by examiner

SYSTEMS AND METHODS OF DETECTING AN OBSTRUCTED FURNACE AIR FILTER USING A PRESSURE SENSOR

FIELD OF TECHNOLOGY

The present disclosure relates generally to systems and methods for detecting an obstructed air filter in a burner assembly, and, more specifically, to systems and methods for detecting an obstructed air filter in a furnace.

BACKGROUND

Gas burner assemblies, such as those used in a furnace, boiler, or water heater, utilize a mixture of air and fuel to create a flame. The heat generated by the flame can be used to heat water or air used in residential and industrial applications. In many cases, the air entering the burner assembly system is filtered to prevent foreign matter from entering the burner assembly and altering the flame output or otherwise affecting the performance of the burner assembly. The filter, however, can become obstructed over time and restrict the air admitted into the burner system. When the air becomes obstructed, the flame temperature rises and an increased amount of particulates (e.g., carbon dioxide, carbon monoxide, nitrogen oxides, etc.) are emitted to the atmosphere as the flame is no longer able to burn the fuel efficiently. The increased particulate emission can be harmful to the environment and can run afoul of local regulations. An obstructed filter can further cause thermal acoustics on the burner surface resulting in an undesirable high-pitched whistle or other noises coming from the burner system. Furthermore, if left undetected, the filter can become restricted to the point where the filter is entirely clogged and the burner system is rendered inoperable.

To help ensure the air filter does not become obstructed to the point where the burner assembly begins to emit an undesirably high amount of particulates, some burner systems monitor the pressure across the air filter. As the air filter becomes obstructed, the pressure across the air filter will increase and reach a threshold pressure where the system will either shutdown or transmit an alarm. One method of monitoring the pressure across the air filter includes using a normally-closed differential pressure switch that is configured to open when the pressure reaches the threshold pressure. As the pressure switch opens, the fuel valve is de-energized and closes to extinguish the flame and prevent the burner assembly from emitting unacceptable levels of particulates to the atmosphere. This configuration, however, is limited because the normally-closed switch must be physically checked by a technician to ensure the switch is working. That is, because the switch is normally closed, it could be malfunctioning or inoperable such that it does not transition to an open state, and to identify such malfunction or inoperability, the normally-closed switch must be serviced and/or inspected, typically by a technician.

What is needed, therefore, is a method and system for detecting an obstructed air filter quickly with a device that can be verified as operational without the need for servicing the burner system. This and other problems are addressed by the technology disclosed herein.

SUMMARY

The disclosed technology relates generally to systems and methods for detecting an obstructed air filter in a burner assembly, and, more specifically, to systems and methods for detecting an obstructed air filter in a furnace.

The disclosed technology can include a non-transitory, computer-readable medium having instructions stored thereon that, when executed by one or more processors, cause a system to receive, from a pressure sensor, a signal indicating whether a pressure sensor switch of the pressure sensor is open or closed. The pressure sensor can be configured to open the pressure sensor switch in response to detecting that a differential pressure across an air filter associated with a burner is greater than or equal to a threshold differential pressure. The system can determine that the air filter is at least partially obstructed in response to determining, based at least in part on the signal received from the pressure sensor, that the differential pressure across the air filter is greater than or equal to the threshold differential pressure and output an alarm signal indicating that the air filter is at least partially obstructed.

The system, after receiving a start signal, can determine whether the pressure sensor switch is open or closed. In response to determining that the pressure sensor switch is closed, the system can output an alarm signal to indicate that the pressure sensor switch has malfunctioned.

The system, after a predetermined amount of time since receiving the start signal, can determine whether the pressure sensor switch is open or closed. In response to determining that the pressure sensor switch is open after the predetermined amount of time, the system can output the alarm signal to indicate that the pressure sensor switch has malfunctioned.

The system can also, in response to determining that the pressure sensor switch is closed, output a control signal for a fuel valve associated with the burner to at least partially close.

The disclosed technology can also include a non-transitory, computer-readable medium having instructions stored thereon that, when executed by one or more processors, cause a system to receive, from a pressure sensor, differential pressure data indicative of a differential pressure across an air filter associated with a burner. The system, after receiving the differential pressure data, can determine that the air filter is at least partially obstructed in response to determining, based at least in part on the differential pressure data, that the differential pressure across the air filter is greater than or equal to a threshold differential pressure output an alarm signal indicating that the air filter is at least partially obstructed.

The system can also determine, based at least in part on the differential pressure data, that the differential pressure across the air filter is greater than or equal to the threshold differential pressure for a predetermined amount of time and output an alarm signal indicating that the air filter is at least partially obstructed.

The system can also determine, based at least in part on the differential pressure data, that the differential pressure across the air filter is greater than or equal to the threshold differential pressure for a second predetermined amount of time and output a control signal for a fuel valve associated with the burner to at least partially close. The system can determine that the air filter is at least partially obstructed by determining, based at least in part on the differential pressure data, that the differential pressure across the air filter is greater than or equal to a second threshold differential pressure. The second threshold differential pressure can be greater than the threshold differential pressure. The system, upon determining that the air filter is at least partially obstructed, can output a control signal for a fuel valve associated with the burner to at least partially close.

The system can also determine, based at least in part on the differential pressure data, that the differential pressure across the air filter is greater than or equal to a second threshold differential pressure for a predetermined amount of time and output a control signal for a fuel valve associated with the burner to at least partially close.

The disclosed technology can also include a furnace system capable of detecting an obstructed air filter. The furnace system can include an air inlet, an air filter for filtering particles from air passing through the air inlet, an air moving device configured to move the air from the air inlet, through the air filter, and toward a combustion chamber, a fuel valve configured to direct fuel into the air being moved toward the combustion chamber, a burner configured to create a flame by burning a mixture of the fuel and the air, a pressure sensor configured to detect a differential pressure across the air filter, and a controller. The controller can be configured to receive a signal from the pressure sensor and determine, based at least in part on the signal received from the pressure sensor, that the differential pressure across the air filter is greater than or equal to a threshold differential pressure. In response to determining that the differential pressure across the air filter is greater than or equal to the threshold differential pressure, the controller can determine that the air filter is at least partially obstructed and output an alarm signal indicating that the air filter is at least partially obstructed.

The signal received from the pressure sensor can be an indication that the pressure sensor has opened a pressure sensor switch. The pressure sensor can open the pressure sensor switch when the pressure sensor detects a differential pressure across the air filter greater than or equal to the threshold differential pressure. If the signal received from the pressure sensor is an indication that the pressure sensor has opened a pressure sensor switch, the control can, after receiving a start signal, determine if the pressure sensor switch is open or closed. In response to determining that the pressure sensor switch is closed, the controller can output an alarm signal to indicate that the pressure sensor switch has malfunctioned or the air filter is clogged.

If the signal received from the pressure sensor is an indication that the pressure sensor has opened a pressure sensor switch, the control can also, after a predetermined amount of time since receiving the start signal, determine if the pressure sensor switch is open or closed. In response to determining that the pressure sensor switch is open after the predetermined amount of time, the controller can output the alarm signal to indicate that the pressure sensor switch has malfunctioned. Alternatively, in response to determining that the pressure sensor switch is open after the predetermined amount of time, the controller can output a control signal for the fuel valve to at least partially close and output an alarm signal or a control signal to shut down the system.

The signal received from the pressure sensor(s) can be differential pressure data indicative of a differential pressure across the air filter. If the signal received from the pressure sensor is differential pressure data indicative of a differential pressure across the air filter, the controller can determine that the air filter is at least partially obstructed in response to determining, based at least in part on the differential pressure data, that the differential pressure across the air filter is greater than or equal to the threshold differential pressure. The controller can then output an alarm signal indicating that the air filter is at least partially obstructed. The controller can also output a control signal for the fuel valve to at least partially close.

The controller can also determine that the air filter is at least partially obstructed in response to determining, based at least in part on the differential pressure data, that the differential pressure across the air filter is greater than or equal to a second threshold differential pressure. The second threshold differential pressure can be greater than the threshold differential pressure. The controller can also output an alarm signal indicating that the air filter is at least partially obstructed and a control signal for the fuel valve to at least partially close.

The controller can also determine that the air filter is at least partially obstructed in response to determining, based at least in part on the differential pressure data, that the differential pressure across the air filter is greater than or equal to the threshold differential pressure for a second predetermined amount of time and output the alarm signal indicative of an obstructed air filter.

The controller can also determine that the air filter is at least partially obstructed in response to determining, based at least in part on the differential pressure data, that the differential pressure across the air filter is greater than or equal to the threshold differential pressure for a third predetermined amount of time. The third predetermined amount of time can be greater than the second predetermined amount of time. The controller can output the alarm signal indicative of an obstructed air filter and a control signal for the fuel valve to at least partially close.

Additional features, functionalities, and applications of the disclosed technology are discussed herein in more detail.

BRIEF DESCRIPTION OF THE DRAWINGS

The accompanying drawings, which are incorporated in and constitute a part of this specification, illustrate multiple examples of the presently disclosed subject matter and serve to explain the principles of the presently disclosed subject matter. The drawings are not intended to limit the scope of the presently disclosed subject matter in any manner.

DETAILED DESCRIPTION

Figure 1:
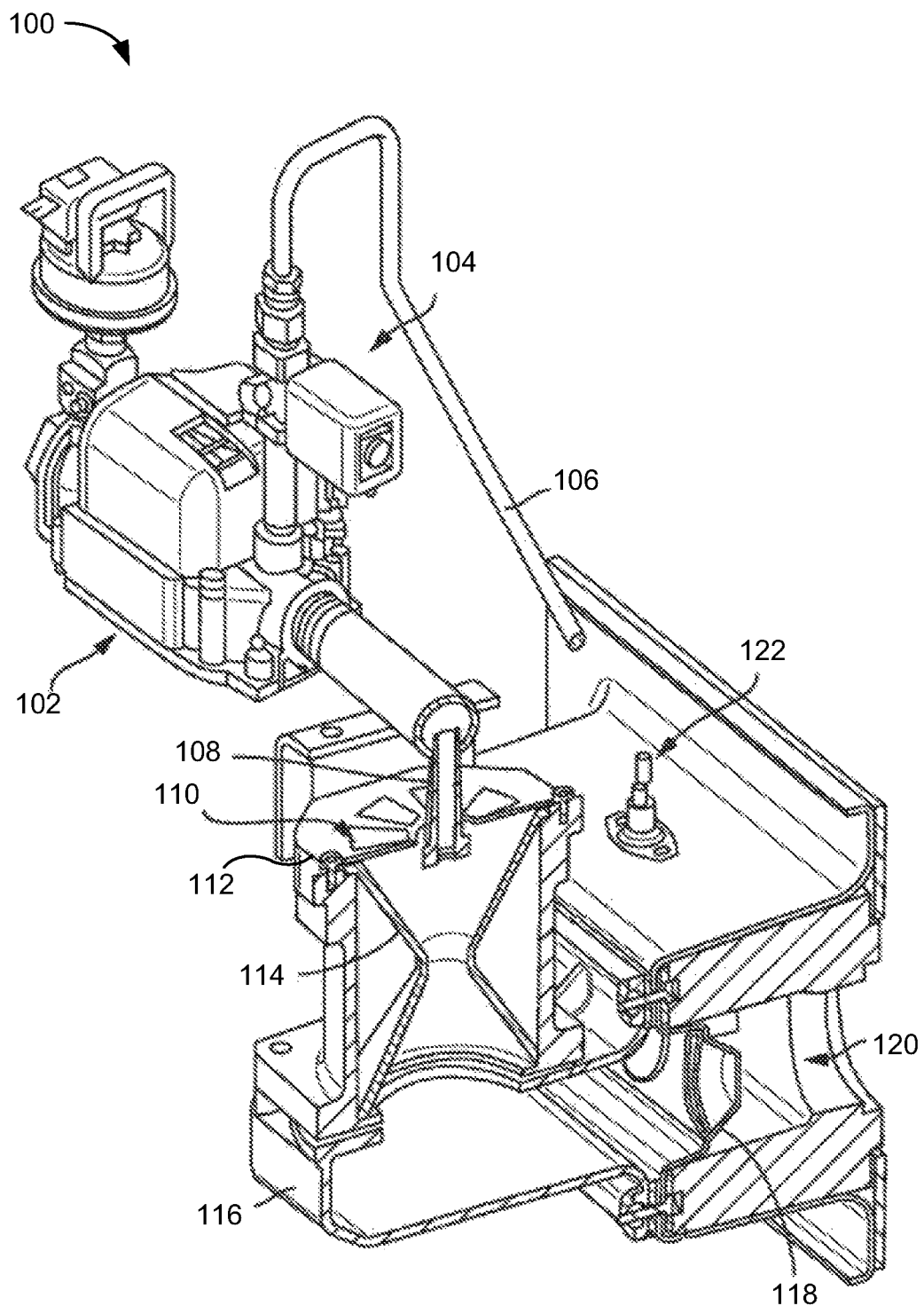
FIG. 1 illustrates an example of an existing burner assembly for a furnace.

The disclosed technology relates generally to systems and methods for detecting an obstructed air filter in a burner assembly, and, more specifically, to systems and methods for detecting an obstructed air filter in a furnace. The disclosed technology can include an air inlet, an air filter, a fuel valve, a burner assembly, a combustion chamber, a pressure sensor, an alarm device, and a controller in communication with the pressure sensor, the fuel valve, and the alarm device. The controller can receive pressure data from the pressure sensor and determine, based on the pressure data, whether the air filter is likely to be at least partially obstructed. Upon determining that the air filter is likely to be at least partially obstructed, the controller can output an alarm signal to the alarm device and a control signal to the fuel valve to close the fuel valve. The disclosed technology can be used with any gas-fired system used to heat a fluid, including residential and commercial furnaces and water heaters, but is not so limited.

Although certain examples of the disclosed technology are explained in detail herein, it is to be understood that other examples, embodiments, and implementations of the disclosed technology are contemplated. Accordingly, it is not intended that the disclosed technology is limited in its scope to the details of construction and arrangement of components expressly set forth in the following description or illustrated in the drawings. The disclosed technology can be implemented in a variety of examples and can be practiced or carried out in various ways. In particular, the presently disclosed subject matter is described in the context of being a system and method for detecting an at least partially obstructed air filter in a burner assembly of a furnace. The present disclosure, however, is not so limited, and can be applicable in other contexts. The present disclosure, for example and not limitation, can include burner systems used in gas water heaters, boilers, and other systems having a burner assembly. Such implementations and applications are contemplated within the scope of the present disclosure. Accordingly, when the present disclosure is described in the context of being a system and method for detecting an at least partially obstructed air filter in a burner assembly of a furnace, it will be understood that other implementations can take the place of those referred to.

It should also be noted that, as used in the specification and the appended claims, the singular forms "a," "an," and "the" include plural references unless the context clearly dictates otherwise. References to a composition containing "a" constituent is intended to include other constituents in addition to the one named.

Also, in describing the examples, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, the various examples of the disclosed technology includes from the one particular value and/or to the other particular value. Further, ranges described as being between a first value and a second value are inclusive of the first and second values. Likewise, ranges described as being from a first value and to a second value are inclusive of the first and second values.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is also to be understood that the mention of one or more method steps does not preclude the presence of additional method steps or intervening method steps between those steps expressly identified. Moreover, although the term "step" can be used herein to connote different aspects of methods employed, the term should not be interpreted as implying any particular order among or between various steps herein disclosed unless and except when the order of individual steps is explicitly required. Further, the disclosed technology does not necessarily require all steps included in the example methods and processes described herein. That is, the disclosed technology includes methods that omit one or more steps expressly discussed with respect to the examples provided herein.

The components described hereinafter as making up various elements of the disclosed technology are intended to be illustrative and not restrictive. Many suitable components that would perform the same or similar functions as the components described herein are intended to be embraced within the scope of the disclosed technology. Such other components not described herein can include, but are not limited to, for example, similar components that are developed after development of the presently disclosed subject matter.

Referring now to the drawings, in which like numerals represent like elements, examples of the present disclosure are herein described. FIG. 1 illustrates an example of an existing burner assembly 100 (e.g., a burner assembly for a furnace) into which one or more aspects of the disclosed technology can be incorporated. It should be noted that, although the burner assembly 100 depicted by FIG. 1 refers to an example of an existing burner assembly, the illustrated burner assembly 100, and any other burner assemblies, can be outfitted with one or more aspects and/or elements of the disclosed technology, as described more fully herein. Further, while the burner assembly 100 is depicted in FIG. 1 as being as an ultra-low $NO_x$ burner (a ULN burner), the burner assembly 100 can be any type of burner assembly that includes an air filter and a pressure sensor.

As an example of how the burner assembly 100 can operate, the burner assembly 100 can begin the ignition process by providing a mixture of air and fuel to a burner 118. The air can be provided by, for example, powering an air moving device (not shown in FIG. 1) to draw air through the burner assembly 100 and the fuel can be provided to the burner 118 by opening a fuel valve 102 to deliver fuel to the burner 118 (e.g., via a fuel delivery tube 108). Optionally, the burner assembly 100 can include a venturi air/fuel mixer 114, and the fuel valve 102 can open to deliver fuel through the fuel delivery tube 108 to the venturi air/fuel mixer 114. The venturi air/fuel mixer 114 can help to ensure air and fuel are mixed before entering the burner 118. If a venturi air/fuel mixer 114 is used, the negative pressure created at the venturi air/fuel mixer 114 can draw air into the venturi air/fuel mixer 114 through an optional air diffuser 112. To prevent particles from entering the burner assembly 100, the air diffuser 112 (or another portion of the burner assembly 100) can include an air filter 110. As will be appreciated, as the air filter 110 collects particles the air filter 110 will become partially obstructed and a differential pressure across the air filter 110 will rise.

The mixture of air and fuel can then be passed to an optional air/fuel mixing chamber 116, where further mixing of the air and fuel can occur, and then to the burner 118 where an igniter (not shown) can ignite the air/fuel mixture to create a flame and direct heat through the combustion chamber 120. In situations where additional fuel is desirable, such as during the ignition process, the burner assembly 100 can utilize a fuel enrichment valve 104 to deliver a supply of fuel directly to the burner 118 (e.g., via the fuel enrichment delivery tube 106). Furthermore, a flame sensor 122 can also be used to detect the presence or non-presence of a flame in the burner 118. As will be appreciated, the burner assembly 100 can include more or fewer components than those just described.

Figure 2:
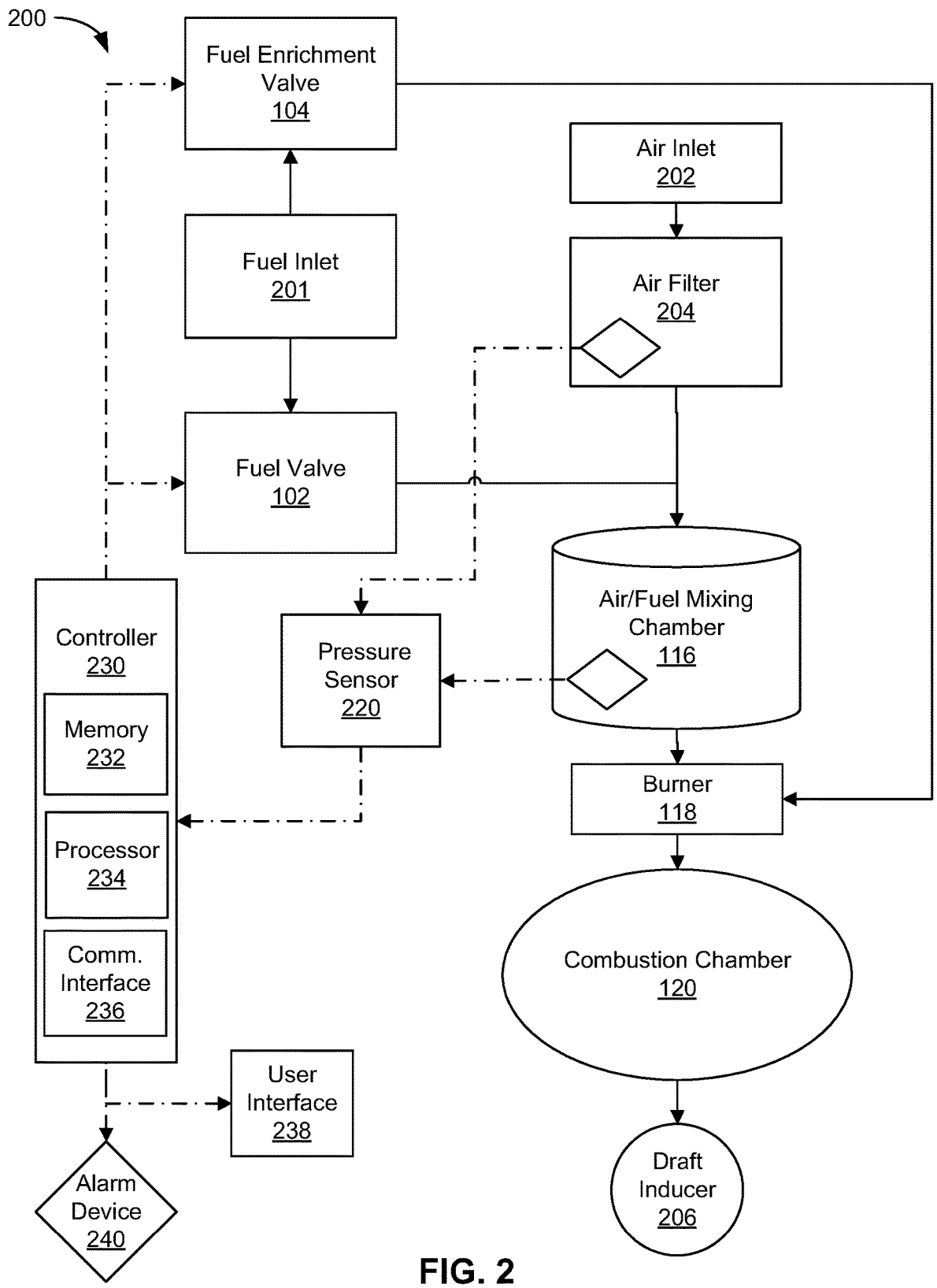
FIG. 2 illustrates a schematic diagram of a system for detecting an obstructed air filter in a burner assembly, in accordance with the disclosed technology.

FIG. 2 is a schematic diagram illustrating a system 200 for detecting an at least partially obstructed air filter in a burner assembly, in accordance with the disclosed technology. A system 200 for detecting an at least partially obstructed air filter in a burner assembly (e.g., burner assembly 100) can have a fuel inlet 201 that is in fluid communication with the same or similar elements as those previously described in relation to FIG. 1, such as a fuel valve 102, a fuel enrichment valve 104, an air/fuel mixing chamber 116, a burner 118, and/or a combustion chamber 120. The system 200 can also have an air inlet 202 and an air filter 204. The air inlet can be the same as air diffuser 112 or it can be a different air inlet depending on the particular application. Similarly, the air filter 204 can be the same as air filter 110 or air filter 204 can be a different air filter depending on the particular application. The system 200 can be configured to draw air through the system 200 by an air moving device 206. Furthermore, the system 200 can have a controller 230 having a memory 232, a processor 234, and a communication interface 236. The controller 230 can be in communication with the fuel valve 102, a pressure sensor 220, a user interface 238, and an alarm device 240.

The system 200 can be operated in the same or similar manner to create a flame as previously described in relation to FIG. 1. For instance, the air moving device 206 can cause air to be drawn through the system 200, the fuel valve 102 can open to pass an amount fuel to the burner 118, and the mixture of air and fuel can be ignited at the burner 118 to create a flame.

The system 200 (and/or the burner assembly 100) can include a pressure sensor 220 that is configured to detect a differential pressure across the air filter 204, and the pressure sensor 220 can be configured to transmit (e.g., to the controller 230) pressure data indicative of the detected differential pressure. The pressure sensor 220 can be any type of pressure sensor, pressure transducer, or pressure switch capable of detecting a differential pressure across the air filter 204. For example, the pressure sensor 220 can be or include an orifice-plate-type, venturi-type, flow-nozzle-type, pitot-tube-type, or any other type of pressure sensor capable of detecting and transmitting a differential pressure. As another example, the pressure sensor 220 can be or include one or more pressure transducers configured to detect a pressure across the air filter 204 by detecting a pressure upstream and downstream of the air filter 204. The pressure detected by the one or more pressure transducers can be output as pressure data to the controller 230 to determine a pressure differential. As will be appreciated, the pressure sensor can include any device or combination of devices capable of detecting and/or determining a pressure differential across the air filter 204, and the particular type of pressure sensor 220 chosen for a given application can be capable of withstanding the pressures exhibited in the system 200 for the chosen application.

The air moving device 206 can be any type of air moving device configured to draw air through the system. For example, the air moving device 206 can be a draft inducer, a fan, a blower, or any other air moving device configured to move air through the system.

The controller 230 can have a memory 232, and a processor 234, and be in communication with a user interface 238. The controller 230 can be a computing device configured to receive data, determine actions based on the received data, and output a control signal instructing one or more components of the system to perform one or more actions. One of skill in the art will appreciate that the controller 230 can be installed in any location, provided the controller 230 is in communication with at least some of the components of the system. Furthermore, the controller 230 can be configured to send and receive wireless or wired signals and the signals can be analog or digital signals. The wireless signals can include Bluetooth™, BLE, WiFi™, ZigBee™, infrared, microwave radio, or any other type of wireless communication as may be appropriate for the particular application. The hard-wired signal can include any directly wired connection between the controller and the other components. For example, the controller 230 can have a hard-wired 24 VDC connection to the pressure sensor 220. Alternatively, the components can be powered directly from a power source and receive control instructions from the controller 230 via a digital connection. The digital connection can include a connection such as an Ethernet or a serial connection and can utilize any appropriate communication protocol for the application such as Modbus, fieldbus, PROFIBUS, SafetyBus p, Ethernet/IP, or any other appropriate communication protocol for the application. Furthermore, the controller 230 can utilize a combination of wireless, hard-wired, and analog or digital communication signals to communicate with and control the various components. One of skill in the art will appreciate that the above configurations are given merely as non-limiting examples and the actual configuration can vary depending on the application.

The controller 230 can include a memory 232 that can store a program and/or instructions associated with the functions and methods described herein and can include one or more processors 234 configured to execute the program and/or instructions. The memory 232 can include one or more suitable types of memory (e.g., volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like) for storing files including the operating system, application programs (including, for example, a web browser application, a widget or gadget engine, and or other applications, as necessary), executable instructions and data. One, some, or all of the processes or methods described herein can be implemented as a combination of executable instructions and data within the memory.

The controller 230 can be connected to a communication interface 236 for sending and receiving communication signals between the various components. Communication interface 236 can include hardware, firmware, and/or software that allows the processor(s) 234 to communicate with the other components via wired or wireless networks, whether local or wide area, private or public, as known in the art. Communication interface 236 can also provide access to a cellular network, the Internet, a local area network, or another wide-area network as suitable for the particular application.

Additionally, the controller 230 can have or be in communication with a user interface 238 for displaying system information and receiving inputs from a user. The user interface 238 can be installed locally on the system 200 or be a remotely-control device such as a mobile device. The user, for example, can view and input data to set the pressure range of expected normal operating system pressures and expected pressures exhibited when the filter 204 is at least partially obstructed. The user can also program threshold system pressures (e.g., an alarm differential pressure and a high-limit differential pressure) for the controller 230 to determine when to take certain actions based on the system pressure. For example, the alarm differential pressure can be a threshold differential pressure that can indicate that the air filter 204 is at least partially obstructed and should be cleaned. On the other hand, the high-limit differential pressure can be a second threshold differential pressure greater than the alarm differential pressure that can indicate that the air filter 204 has become even more obstructed and the system 200 should be shut down before the system 200 is damaged.

The alarm device 240 can be any form of alarm device configured to provide a notification to a user. For example, the alarm device 240 can be a light bulb or light emitting diode (LED) indicator configured to illuminate on the user interface 238 or another location on the system likely to be seen by a user. As another example, the alarm device 240 can be an audible alarm or alert. Alternatively, or in addition, the alarm device 240 can be a notification displayed on the user interface 238 or transmitted to a user's mobile device. As will be appreciated, the alarm device 240 can be any type of alarm device configured to provide notification to a user that the air filter 204 is likely to be at least partially obstructed.

The fuel valve 102 and the fuel enrichment valve 104 can be configured to control a flow of fuel from a fuel source. Both the fuel valve 102 and the fuel enrichment valve 104 can be configured for any type of fuel used in the burner assembly 100, such as, for example, propane, butane, natural gas, coal gas, biogas, acetylene, gasoline, diesel fuel, or any other type of fuel suitable for the application. Furthermore, the fuel valve 102 and the fuel enrichment valve 104 can be any type of fuel valve as would be suitable for the particular application. For example, the fuel valve 102 and the fuel enrichment valve 104 can be a solenoid operated valve configured to be normally closed such that a loss of power causes the solenoid operated valve to close and prevent fuel from passing through the burner assembly 100. Alternatively, or in addition, the fuel valve 102 can be a two-stage valve or a stepper valve to further control the flow of fuel through the burner assembly 100. The fuel valve 102 and the fuel enrichment valve 104 can be controlled by the controller 230 based on control logic as well as inputs received at the controller 230 from the pressure sensor 220.

As depicted in FIG. 2, the pressure sensor 220 can be in communication with the controller 230 and provide pressure data to the controller 230, the pressure data being indicative of the current differential pressure across the air filter 204. The pressure sensor 220 can detect a first pressure prior to the air filter 204 and a second pressure after the air filter 204. For example, the pressure sensor 220 can detect a first pressure upstream from the air filter 204 (e.g., proximate the air filter 204 on an upstream side of the air filter 204) and downstream from the air filter 204 (e.g., proximate the air filter 204 on a downstream side of the air filter 204). Alternatively, the pressure sensor 220 can detect pressure at a location at or near the air inlet 202 and a location proximate the air/fuel mixing chamber 116. As will be appreciated, the pressure sensor 220 can detect pressures in any pair of locations in the system in which the pair of locations includes both a first location that is upstream from the air filter 204 and a second location that is downstream from the air filter 204 such that the pair of pressures can be used to determine a differential pressure across the air filter 204. Furthermore, the controller 230 can be configured to receive the pressure data from the pressure sensor 220 and determine a differential pressure across the air filter 204, regardless of the position(s) at which the pressure sensor 220 detects the respective pressure(s).

The controller 230 can be configured to monitor the pressure data provided by the pressure sensor 220 to detect when the differential pressure across the air filter 204 reaches a predetermined threshold differential pressure. The predetermined threshold differential pressure can be a differential pressure indicative of an at least partially obstructed air filter 204. For example, as will be appreciated by those skilled in the art, as an air filter 204 becomes at least partially obstructed, less air is able to enter the system which can cause the differential pressure across the air filter to rise. As a non-limiting example, a normal operation differential pressure (i.e., a differential pressure corresponding to an unobstructed air filter 204) of a burner system 100 can be approximately −1.15 inches water column. As the air filter 204 becomes obstructed, the differential pressure can begin to vary from the normal operational differential pressure depending on the amount of obstruction. For example, as the air filter 204 becomes 25% obstructed the differential pressure can change approximately 0.02 inches water column from the normal operational differential pressure. As other examples, the differential pressure can change approximately 0.1 inches water column for a 50% obstruction, approximately 0.2 inches water column for a 60% obstruction, approximately 0.25 inches water column for a 65% obstruction, approximately 0.3 inches water column for a 70% obstruction, and approximately 0.4 inches water column for an 80% obstruction. As another example, a normal operation differential pressure can be approximately −1.9 inches water column, and the change in differential pressure as the air filter 204 becomes obstructed can be approximately 0.03 inches water column for a 50% obstruction, approximately 0.15 inches water column for a 70% obstruction, and approximately 0.4 inches water column for an 80% obstruction. As will be appreciated, the particular differential pressures in a burner system 100 during normal operation and when an air filter 204 is obstructed can vary depending on the type of burner system and the particular components and application of the burner system 100. Despite variances in normal and abnormal differential pressure across the air filter in different furnace systems, the controller 230 can be configured to detect changes in the differential pressure that can indicate the air filter 204 is likely to be at least partially obstructed.

The controller 230 can be configured to detect changes in the differential pressure across various types of burner systems. For example, the controller 230 can be programmed specifically with the expected differential pressure range of the particular system and for the specific pressure sensor 220 used by the system. Alternatively, the controller 230 can store a program in the memory 232 that, when executed by the processor 234, causes the controller 230 to store, monitor, and analyze trends of historical operational differential pressures to determine a normal differential pressure across the air filter 204. As the controller 230 continues to monitor the differential pressure over time, the controller 230 can determine that the differential pressure has increased to a value greater than an upper limit of the normal operating differential pressure such that the detected differential pressure is indicative of an at least partially obstructed air filter 204. Alternatively, or in addition, the controller 230 can use the stored differential pressure data to determine an alarm differential pressure threshold and/or a high-limit differential pressure threshold. For example, if the controller 230 determines a normal operating differential pressure range based on the stored differential pressure data, the controller 230 can determine that an alarm differential pressure threshold is a value that is approximately 0.2 inches water column greater than the upper limit of the normal operating differential pressure range and/or that the high-limit differential pressure threshold is a value that is approximately 0.3 to 0.4 inches water column greater than the upper limit of the normal operating differential pressure range.

When the controller 230 determines that an air filter 204 is at least partially obstructed (e.g., based on the determined differential pressure being greater than a differential pressure threshold or the upper limit of a normal operating differential pressure range), the controller 230 can output an alarm signal to an alarm device 240 and/or the user interface 238. The controller 230 can alternatively, or in addition, output a control signal for the fuel valve 102 and/or the fuel enrichment valve 104 to at least partially close. For example, the controller 230, upon determining that an air filter 204 is at least partially obstructed, can output an alarm signal to the alarm device 240 to notify a user that the air filter is at least partially obstructed. The alarm device 240 can be or include any of the alarm devices previously described to notify the user. Alternatively, or in addition, the controller 230 can output a control signal for the fuel valve 102 to close the fuel valve 102. The control signal can be or include a control signal that closes the fuel valve 102 such as deenergizing a solenoid connected to the fuel valve. The controller 230 can also output a control signal for the fuel enrichment valve 104 to close the fuel enrichment valve 104 if the fuel enrichment valve 104 is open at the time the controller 230 determines the air filter 204 is at least partially obstructed. By closing both the fuel valve 102 and the fuel enrichment valve 104, the controller 230 can ensure that fuel is no longer supplied to the system 200 and the flame will become extinguished. In this way, the controller 230 can act to protect the system 200 from damage or other dangers that could occur from operating the system 200 with a high flame temperature caused by an at least partially obstructed air filter 204.

The controller 230 can determine that an air filter 204 is at least partially obstructed by monitoring the differential pressure data received from the pressure sensor 220 to determine when the differential pressure has reached a predetermined differential pressure. For example, the controller 230 can monitor the differential pressure and determine that air filter 204 is at least partially obstructed when the differential pressure −0.2 inches water column, −0.9 inches water column, −1.5 inches water column, −1.9 inches water column or any other differential pressure that would be applicable to the system. As will be appreciated by those of skill in the art, the predetermined differential pressure can be any differential pressure applicable to the system and, as previously described, can be manually set or be determined by the controller 230.

Alternatively, the controller 230 can monitor the differential pressure across the air filter 204 to determine when the differential pressure has been greater than or equal to a predetermined differential pressure for a predetermined amount of time. By monitoring the differential pressure to determine if it has been greater than or equal to a predetermined differential pressure for a predetermined amount of time, the controller 230 can account for anomalies in differential pressure data, temporary obstructions in the air filter or in the system, a temporary speed fluctuation of the air moving device 206, pressure fluctuations caused by wind gusts, and other temporary conditions that can cause the differential pressure to be greater than the normal operating differential pressure but are not indicative of an at least partially obstructed air filter. The predetermined differential pressure can be the same or a different predetermined differential pressure values than that just described. Furthermore, the predetermined amount of time can be any amount of time determined suitable for the particular application. For example, the predetermined amount of time can be a fraction of a second to several minutes depending on the particular application. As another example, the predetermined amount of time can be from about 5 seconds to about 8 seconds.

Figure 3:
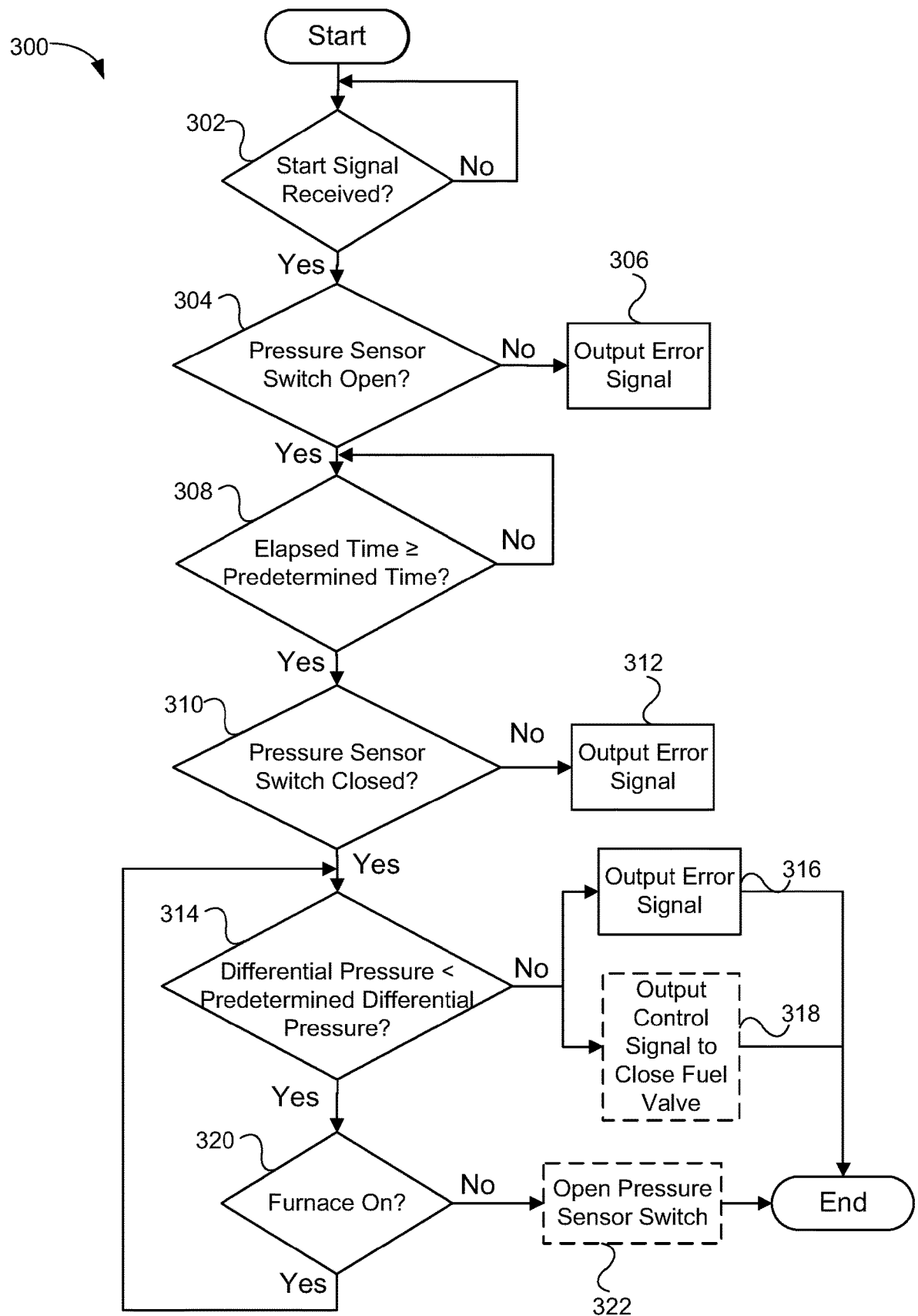
FIG. 3 illustrates a logic diagram of a method of detecting an obstructed air filter in a burner assembly, in accordance with the disclosed technology.
Figure 4:
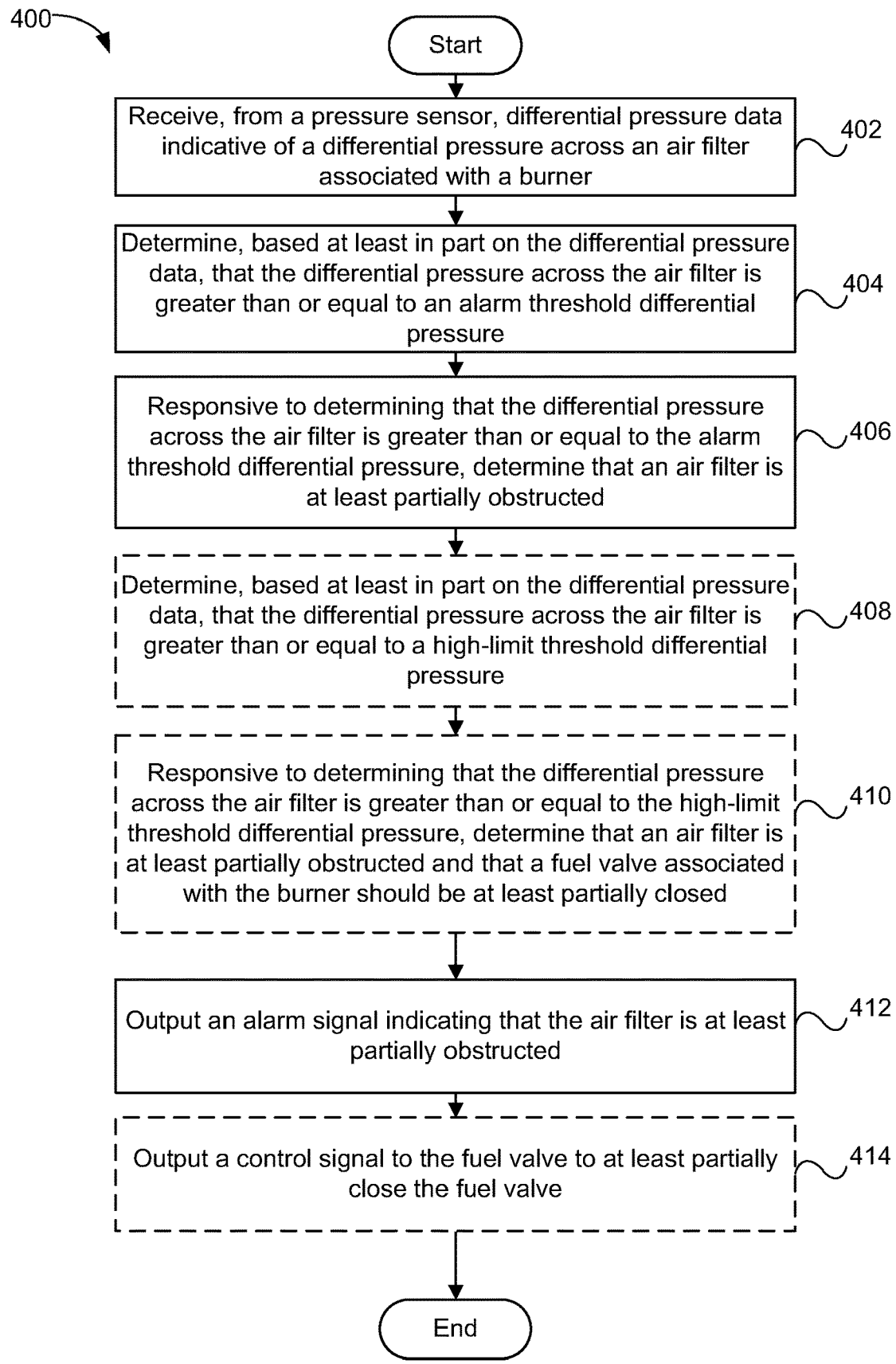
FIG. 4 is flowchart illustrating a method of detecting an obstructed air filter in a burner assembly, in accordance with the disclosed technology.
Figure 5:
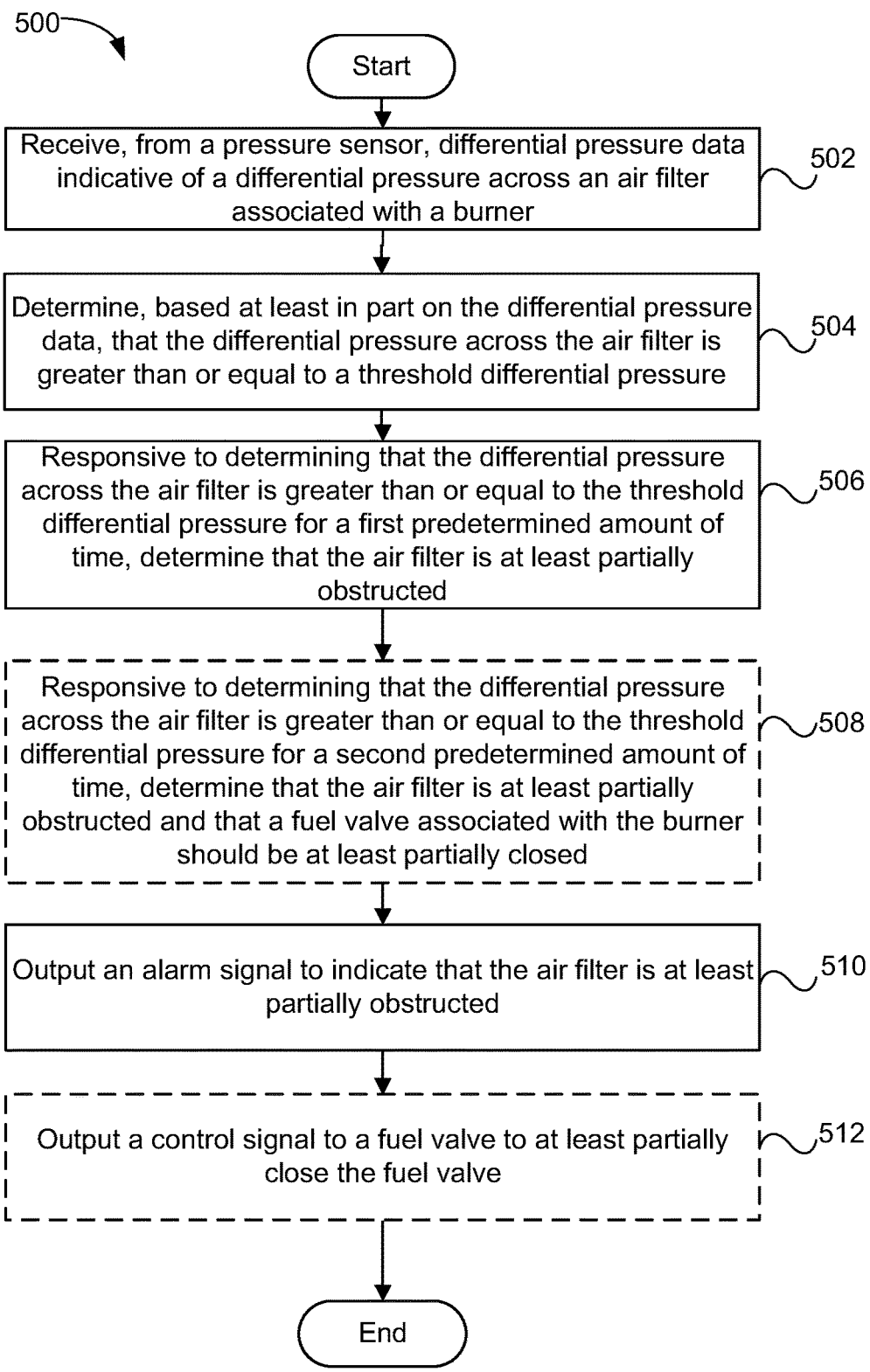
FIG. 5 is flowchart illustrating another method of detecting an obstructed air filter in a burner assembly, in accordance with the disclosed technology.

The system 200 depicted in FIG. 2 can be operated according to the methods just described as well as the methods depicted in FIGS. 3, 4, and 5 and described herein. As will be appreciated, the methods described can be executed by the controller 230 in communication with the various elements (i.e., pressure sensor 220, fuel valve 102, fuel enrichment valve 104, and alarm device 240).

FIG. 3 is a logic diagram illustrating a method of detecting an at least partially obstructed air filter in a burner assembly, in accordance with the disclosed technology. The method 300 can include determining 302 if a start signal has been received by the controller (e.g., controller 230). If a start signal has not been received, the method 300 can include continuing to determine 302 whether a start signal has been received. If a start signal has been received, the method 300 can include determining 304 if a pressure sensor switch is open. If a switch associated with the pressure sensor is not open, the method 300 can include outputting 306 an error signal to notify a user that the pressure sensor has likely malfunctioned. If the switch associated with the pressure sensor is open, the method 300 can include determining 308 if an elapsed time is greater than or equal to a predetermined time value. If an elapsed time is not greater than or equal to a predetermined time value, the method 300 can include continuing to determine 308 if an elapsed time is greater than or equal to a predetermined time value. By continuing to determine 308 if an elapsed time is greater than or equal to a predetermined time value, the method 300 can include a delay to ensure the method 300 is able to determine a difference between the open and closed pressure switch.

If an elapsed time is greater than or equal to a predetermined time value, the method 300 can include determining 310 if the pressure switch has closed. The pressure switch can be closed, for example, when the inducer is energized or after the controller determines that a predetermined amount of time has elapsed. If the pressure switch has not closed, the method 300 can include outputting 312 an error signal to indicate that the pressure sensor has likely malfunctioned. If the pressure switch has closed, the method 300 can include determining 314 if a differential pressure is less than a predetermined differential pressure (e.g., a threshold differential pressure). If a differential pressure is greater than or equal to a predetermined differential pressure, the method can include outputting 316 an error signal to indicate that an air filter is at least partially obstructed. Alternatively, or in addition, if a differential pressure is greater than or equal to a predetermined differential pressure, the method 300 can include outputting 318 a control signal to close a fuel valve which can end the cycle.

If a differential pressure is less than a predetermined differential pressure, the method 300 can include determining 320 if the furnace is on. If the furnace is no longer on, the method 300 can include opening 322 the pressure sensor switch and ending the cycle. Alternatively, opening 322 the pressure sensor switch can occur just after determining 302 that a start signal has been received. If the furnace is still on, the method 300 can include continuing to determine 314 if a differential pressure is less than a predetermined differential pressure and determining 320 if the furnace is still on. In this way, the method 300 can continue to monitor the differential pressure across the air filter as the furnace is operating and output an error signal if the differential pressure is greater than the predetermined differential pressure.

FIG. 4 is flowchart illustrating a method of detecting an at least partially obstructed air filter in a burner assembly, in accordance with the disclosed technology. The method 400 can include receiving 402, from a pressure sensor (e.g., pressure sensor 220), differential pressure data indicative of a differential pressure across an air filter (e.g., air filter 204) associated with a burner. Once differential pressure data has been received, the method 400 can include determining 404, based at least in part on the differential pressure data, that the differential pressure across the air filter is greater than or equal to an alarm threshold differential pressure. Responsive to determining that the differential pressure across the air filter is greater than or equal to the alarm threshold differential pressure, the method can include determining 406, that the air filter is at least partially obstructed. Alternatively, or in addition, the method 400 can include determining 408, based at least in part on the differential pressure data, that the differential pressure across the air filter is greater than or equal to a high-limit threshold differential pressure. Responsive to determining that the differential pressure across the air filter is greater than or equal to the high-limit threshold differential pressure, the method 400 can include determining 410 that the air filter is at least partially obstructed and that a fuel valve (e.g., fuel valve 102) associated with the burner should be at least partially closed (e.g., to prevent damage to the burner assembly, to prevent injury, etc.) The method 400 can include outputting 412 an alarm signal indicating that the air filter is at least partially obstructed. Alternatively, or in addition, the method 400 can include outputting 412 a control signal to a fuel valve to at least partially close the fuel valve. The high-limit threshold differential pressure can be equal to the alarm threshold differential pressure. Alternatively, the high-limit threshold differential pressure can be greater than the alarm threshold differential pressure. Optionally, in response to determining that the differential pressure is greater than or equal to the alarm threshold differential pressure and/or that the differential pressure is greater than or equal to the high-limit threshold differential pressure, the method can include automatically transmitting a request to schedule a service appointment with a burner service provider.

As will be appreciated, the method 400 just described can cause the system to output an alarm when the differential pressure exceeds a threshold differential pressure and, if the differential pressure continues to increase, the method can include outputting a control signal to at least partially close the fuel valve and/or extinguish the flame. In this way, during operating cycles where the differential pressure reaches the alarm differential pressure but not the high-limit differential pressure, the system can continue to operate and provide heat. The alarm can help to notify a user, technician, or other person that the air filter needs to be changed or cleaned. Thus, if the operating cycle finishes without reaching the high-limit alarm differential pressure, the air filter can be replaced after the system has extinguished the flame at the burner without needing to extinguish the flame prematurely.

FIG. 5 is flowchart illustrating another method 500 of detecting an at least partially obstructed air filter in a burner assembly, in accordance with the disclosed technology. The method 500 can include receiving 502, from a pressure sensor (e.g., pressure sensor 220), differential pressure data indicative of a differential pressure across an air filter (e.g., air filter 204). The method 500 can include determining 504, based at least in part on the differential pressure data, that the differential pressure across the air filter is greater than or equal to a threshold differential pressure. If the differential pressure across the air filter is greater than or equal to the threshold differential pressure for at least a first amount of time, the method 500 can include determining 506 that the air filter is at least partially obstructed Alternatively, or in addition, responsive to determining that the differential pressure across the air filter is greater than or equal to the threshold differential pressure for a second predetermined amount of time, the method 500 can include determining 508 that the air filter is at least partially obstructed and that a fuel valve (e.g., fuel valve 102) associated with the burner should be at least partially closed (e.g., to prevent damage to the burner assembly, to prevent injury, etc.). The second amount of time can be equal to the first amount of time. Alternatively, the second amount of time can be greater than the first amount of time. The method 500 can include outputting 510 an alarm signal indicating that the air filter is at least partially obstructed and/or outputting 512 a control signal to a fuel valve to at least partially close the fuel valve. Optionally, in response to determining that the differential pressure is greater than or equal to the threshold differential pressure for the first amount of time and/or the second amount of time, the method 500 can include automatically transmitting a request to schedule a service appointment with a burner service provider.

By continuing to monitor the differential pressure across the air filter for a first predetermined amount of time (as depicted in block 506), the method 500 can help to avoid outputting an alarm when the differential pressure only briefly or temporarily reaches the predetermined alarm differential pressure. This can help to reduce the likelihood that the method 500 will output an alarm unnecessarily.

Furthermore, by continuing to monitor the differential pressure for a second predetermined amount of time (as depicted in block 508), the method 500 can shut down the system to prevent damage to the system or excess particulates from being released to the atmosphere. For example, monitoring the differential pressure for a second predetermined amount of time can allow the user time to rectify the at least partially obstructed air filter without the furnace being automatically shut down mid-cycle. Furthermore, monitoring the flame differential pressure for a second predetermined amount of time can decrease the likelihood that the system will be shut down for a temporary differential pressure spike that would be less likely to cause damage to the system or operate with unacceptable emissions levels.

As will be appreciated, the methods 300, 400, and 500 just described can be varied in accordance with the various elements and examples described herein. That is, methods in accordance with the disclosed technology can include all or some of the steps described above and/or can include additional steps not expressly disclosed above. Further, methods in accordance with the disclosed technology can include some, but not all, of a particular step described above.

While the present disclosure has been described in connection with a plurality of exemplary aspects, as illustrated in the various figures and discussed above, it is understood that other similar aspects can be used, or modifications and additions can be made to the described aspects for performing the same function of the present disclosure without deviating therefrom. For example, in various aspects of the disclosure, methods and compositions were described according to aspects of the presently disclosed subject matter. But other equivalent methods or compositions to these described aspects are also contemplated by the teachings herein. Therefore, the present disclosure should not be limited to any single aspect, but rather construed in breadth and scope in accordance with the appended claims.

What is claimed is:

1. A non-transitory, computer-readable medium having instructions stored thereon that, when executed by one or more processors, cause a system to:
   receive a start signal;
   determine whether a pressure sensor switch of a pressure sensor is open or closed after receiving the start signal;
   in response to determining that the pressure sensor switch is open after receiving the start signal, determine whether the pressure sensor switch is open or closed after a first predetermined amount of time elapses from receiving the start signal;
   in response to determining that the pressure sensor switch is closed after the first predetermined amount of time elapses, determine a differential pressure across an air filter associated with a burner;
   determine whether the differential pressure across the air filter is less than a predetermined threshold differential pressure for the first predetermined amount of time;
   determine, at a first time interval, that the pressure sensor switch is closed after determining that the differential pressure across the air filter is less than the predetermined threshold differential pressure;
   determine, at a second time interval, that the air filter is at least partially obstructed in response to determining that the differential pressure across the air filter is greater than or equal to the predetermined threshold differential pressure;
   output a first alarm signal indicating that the air filter is at least partially obstructed;
   determine, at a third time interval, that the differential pressure across the air filter is greater than or equal to a predetermined high-limit threshold differential pressure for a second predetermined amount of time, wherein the second predetermined amount of time is greater than or equal to the first predetermined amount of time;
   determine that the air filter is at least partially obstructed at the third time interval; and
   output a first control signal for a fuel valve associated with the burner to at least partially close.

2. The non-transitory, computer-readable medium of claim 1, wherein the instructions, when executed by the one or more processors, further cause the system to:
   in response to determining that the pressure sensor switch is closed after receiving the start signal, output a second alarm signal to indicate that the pressure sensor switch has malfunctioned.

3. The non-transitory, computer-readable medium of claim 2, wherein the instructions, when executed by the one or more processors, further cause the system to:
   in response to determining that the pressure sensor switch is open after the first predetermined amount of time, output the second alarm signal to indicate that the pressure sensor switch has malfunctioned.

4. A non-transitory, computer-readable medium having instructions stored thereon that, when executed by one or more processors, cause a system to:
   determine a start signal;
   determine whether a pressure sensor switch of a pressure sensor is open or closed after receiving the start signal;
   in response to determining that the pressure sensor switch is open after receiving the start signal, determine whether the pressure sensor switch is open or closed after a first predetermined amount of time elapses from receiving the start signal;
   in response to determining that the pressure sensor switch is closed after the first predetermined amount of time elapses, determine a differential pressure across an air filter associated with a burner;
   determine whether the differential pressure across the air filter is less than a predetermined threshold differential pressure for the first predetermined amount of time;
   determine, at a first time interval, that the pressure sensor switch is closed after determining that the differential pressure across the air filter is less than the predetermined threshold differential pressure;
   determine, at a second time interval, that the air filter is at least partially obstructed in response to determining, that the differential pressure across the air filter is greater than or equal to a predetermined threshold differential pressure for a first predetermined amount of time;
   output a first alarm signal indicating that the air filter is at least partially obstructed;
   determine, at a third time interval, that the differential pressure across the air filter is greater than or equal to a predetermined high-limit threshold differential pressure for a second predetermined amount of time, wherein the second predetermined amount of time is greater than or equal to the first predetermined amount of time;
   determine that the air filter is at least partially obstructed at the second time interval; and
   output a first control signal for a fuel valve associated with the burner to at least partially close.

5. The non-transitory, computer-readable medium of claim 4, wherein:
   the instructions, when executed by the one or more processors, further cause the system to:
   output a second control signal for a fuel valve associated with the burner to at least partially close.

6. The non-transitory, computer-readable medium of claim 4, wherein:
   the instructions, when executed by the one or more processors, further cause the system to:
   output a second control signal for a fuel valve associated with the burner to at least partially close.

7. The non-transitory, computer-readable medium of claim 6, wherein:
   output a third control signal for a fuel valve associated with the burner to at least partially close.

8. A furnace system capable of detecting an obstructed air filter, the furnace system comprising:
   an air inlet;
   an air filter for filtering particles from air passing through the air inlet;
   an air moving device configured to move the air from the air inlet, through the air filter, and toward a combustion chamber;

a fuel valve configured to direct fuel into the air being moved toward the combustion chamber;

a burner configured to create a flame by burning a mixture of the fuel and the air;

a pressure sensor configured to detect a differential pressure across the air filter; and a controller configured to:
receive a start signal;
determine whether a pressure sensor switch of a pressure sensor is open or closed after receiving the start signal;
in response to determining that the pressure sensor switch is open after receiving the start signal, determine whether the pressure sensor switch is open or closed after a first predetermined amount of time elapses since receiving the start signal;
in response to determining that the pressure sensor switch is closed after the first predetermined amount of time elapses, determine a differential pressure across an air filter associated with a burner;
determine, at a first time interval, that the pressure sensor switch remains closed in response to determining that the differential pressure across the air filter is less than a predetermined threshold differential pressure for the first predetermined amount of time;
determine that the differential pressure across the air filter is greater than or equal to a predetermined threshold differential pressure for a second predetermined amount of time;
in response to determining that the differential pressure across the air filter is greater than or equal to the predetermined threshold differential pressure for the second predetermined amount of time, determine that the air filter is at least partially obstructed at a second time interval;
output a first alarm signal indicating that the air filter is at least partially obstructed;
determine, at a third time interval, that the differential pressure across the air filter is greater than or equal to a predetermined high-limit threshold differential pressure for a third predetermined amount of time, wherein the third predetermined amount of time is greater than or equal to the second predetermined amount of time;
determine that the air filter is at least partially obstructed at the third time interval; and
output a first control signal for a fuel valve associated with the burner to at least partially close.

9. The furnace system of claim 8, wherein the controller is further configured to:
in response to determining that the pressure sensor switch is closed after receiving the start signal, output a second alarm signal to indicate that the pressure sensor switch has malfunctioned.

10. The furnace system of claim 9, wherein the controller is further configured to:
in response to determining that the pressure sensor switch is open after the first predetermined amount of time, output the second alarm signal to indicate that the pressure sensor switch has malfunctioned.

11. The furnace system of claim 8, wherein the signal received from the pressure sensor comprises differential pressure data indicative of a differential pressure across the air filter.

12. The furnace system of claim 11, wherein the controller is further configured to:
determine that the air filter is at least partially obstructed in response to determining, based at least in part on the differential pressure data, that the differential pressure across the air filter is greater than or equal to the threshold differential pressure; and
output a second alarm signal indicating that the air filter is at least partially obstructed.

13. The furnace system of claim 11, wherein the controller is further configured to:
output a second alarm signal indicative of an obstructed air filter.

14. The furnace system of claim 13, wherein the controller is further configured to:
determine that the air filter is at least partially obstructed in response to determining, based at least in part on the differential pressure data, that the differential pressure across the air filter is greater than or equal to the threshold differential pressure for the third predetermined amount of time, the third predetermined amount of time being greater than or equal to the second predetermined amount of time; and
output a second control signal for the fuel valve to at least partially close.

* * * * *